(12) United States Patent
Peterson et al.

(10) Patent No.: US 6,496,110 B2
(45) Date of Patent: Dec. 17, 2002

(54) RAPID FIRE EMERGENCY RESPONSE FOR MINIMIZING HUMAN CASUALTIES WITHIN A FACILITY

(75) Inventors: Edward W. Peterson, Del Mar, CA (US); Richard A. Grot, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/732,175

(22) Filed: Dec. 6, 2000

(65) Prior Publication Data

US 2002/0053978 A1 May 9, 2002

Related U.S. Application Data

(60) Provisional application No. 60/169,530, filed on Dec. 6, 1999.

(51) Int. Cl.[7] .............................................. G08B 19/00
(52) U.S. Cl. .................. 340/522; 340/506; 340/584; 340/573.1; 702/1; 705/9; 236/49.1; 165/281; 62/176.6; 454/322
(58) Field of Search ...................... 340/573.1, 691.2, 340/506, 541, 584, 502, 515, 517, 522, 523, 525, 691.3, 988, 995, 626, 691.6; 187/390; 701/207; 702/33, 1; 710/113; 705/9; 236/46 R, 49.1; 345/782; 165/263, 281; 62/176.6, 3.2; 454/327, 322

(56) References Cited

U.S. PATENT DOCUMENTS

| | | | | |
|---|---|---|---|---|
| 4,023,146 A | * | 5/1977 | Carroll ......................... 710/113 |
| 4,058,253 A | * | 11/1977 | Munk et al. ............... 236/46 R |
| 4,536,747 A | | 8/1985 | Jensen ......................... 340/502 |
| 4,749,985 A | | 6/1988 | Corsberg ..................... 340/517 |
| 4,962,473 A | | 10/1990 | Crain ........................... 340/541 |
| 5,024,263 A | | 6/1991 | Laine et al. ................. 165/283 |
| 5,121,344 A | * | 6/1992 | Laage et al. ................... 702/33 |
| 5,228,306 A | | 7/1993 | Shyu et al. ................. 62/176.6 |
| 5,381,338 A | * | 1/1995 | Wysocki et al. ............ 701/207 |
| 5,602,564 A | * | 2/1997 | Iwamura et al. ............ 345/782 |
| 5,628,050 A | | 5/1997 | McGraw et al. ........... 455/12.1 |
| 5,654,690 A | * | 8/1997 | Ishikawa et al. ............ 340/506 |
| 5,674,125 A | | 10/1997 | Xia et al. ..................... 454/327 |
| 5,726,884 A | * | 3/1998 | Sturgeon et al. ................ 705/9 |
| 5,761,908 A | | 6/1998 | Oas et al. ..................... 62/3.2 |
| 5,977,872 A | | 11/1999 | Guertin ....................... 340/515 |
| 5,979,607 A | * | 11/1999 | Allen .......................... 187/390 |

OTHER PUBLICATIONS

PCT Written Opinion, PCT/US00/42582, filed on Dec. 6, 2000.
International Search Report for Application No. PCT/US00/42582, dated Jun. 13, 2001 (date of mailing).
International Search Report for Application No. PCT/US00/42588, dated Jun. 8, 2001 (date of mailing).

* cited by examiner

Primary Examiner—Benjamin C. Lee
(74) Attorney, Agent, or Firm—Kilpatrick Stockton LLP

(57) ABSTRACT

A method and apparatus are described for responding to a fire emergency at a facility by analyzing a plurality of fire threat conditions to determine possible responses to a fire emergency and selecting a response to the fire emergency for minimizing human casualties within the facility. The present invention may be characterized in one embodiment as a method for generating an automated response to an emergency that includes the steps of (a) receiving as input fire threat condition data for a facility; (b) analyzing the fire threat condition data to determine a matrix of possible responses to a fire emergency; and (c) selecting a response from the matrix of possible responses to minimize human casualties.

24 Claims, 7 Drawing Sheets

RAPID FIRE EMERGENCY RESPONSE FOR MINIMIZING HUMAN CASUALTIES WITHIN A FACILITY

CROSS-REFERENCE TO RELATED APPLICATIONS

This application claims priority under 35 USC §119(e) to U.S. Provisional Patent Application Serial No. 60/169,530 of Peterson, et al, for RAPID EVALUATION OF AND RESPONSE TO THREATS AT FACILITIES, filed Dec. 6, 1999, incorporated herein by reference as if set forth in its entirety. This application is also related to U.S. Utility patent application Ser. No. 09/731,954 of Peterson et al, for RAPID THREAT RESPONSE FOR MINIMIZING HUMAN CASUALTIES WITHIN A FACILITY, filed Dec. 6, 2000.

BACKGROUND OF THE INVENTION

The present invention relates generally to systems for evaluating and responding to emergencies threatening human life at facilities such as government buildings, public gathering places, or any area occupied by one or more persons. More specifically, but without limitation thereto, the present invention relates to monitoring a facility for the presence of fire and smoke that may threaten human life within the facility. Even more specifically, the present invention relates to a computerized system that monitors the presence of fire, smoke, structural damage, and a variety of other collateral damage related to a fire emergency that threatens human life within a facility and generates a response, such as an evacuation plan and control of resources and equipment within the facility, including heating ventilation and air conditioning (HVAC) systems, to minimize human casualties within the facility.

In addition to the threat to human life at facilities posed by accidental fires and the release of hazardous chemical substances in smoke, there has been an increase in apparently random and heinous terrorist attacks in public gathering places, such as government facilities and offices, large business facilities, hospitals, airports, train depots, subway stations, border crossings, and even aboard public carriers, such as airplanes, trains, subways, and ships.

While loss of human life within facilities such as described above as a result of accidental or intentional fires is almost inevitable unless extreme precautionary measures are taken, such as wearing gas masks, the number of human casualties due to injury and death may be dramatically affected by the type of response made against the fire and the speed with which the response is carried out.

Disadvantageously, the complexity involved in analyzing what is an appropriate response to any given fire depends on the location within the facility of the fire, the state of the heating, ventilation, and air conditioning (HVAC) systems, weather conditions, temperatures inside the facility, time of day, concentrations of personnel, building conditions, and the type of incendiary agent employed. Unfortunately, in the panic of a terrorist attack, personnel in facilities are presently ill-equipped to cope with these complexities and the stresses inherent in such an attack. For example, an appropriate response might include operating an HVAC system to minimize the transport of smoke from one area to another while ventilating other areas with as much fresh air as possible. At the same time, personnel may need to be routed through the facility to exits or safer areas.

While in some cases the prior art has provided crude automated responses for fires, these automated responses have not adequately addressed the problem of analyzing different possible responses depending on the specific circumstances and selecting the response most likely to result in the minimum number of human casualties and property damage.

SUMMARY OF THE INVENTION

A method and apparatus are described for responding to an emergency at a facility by analyzing a plurality of fire threat conditions to determine possible responses to a fire emergency and selecting a response to the fire emergency for minimizing human casualties within the facility.

The present invention may be characterized in one embodiment as a system for responding to a fire that threatens to cause human casualties within a facility. The system has a plurality of inputs for receiving signals indicative of fire threat conditions and an emergency response module coupled to the inputs for analyzing the fire threat conditions to determine whether a fire emergency exists and for generating a response to the fire emergency for minimizing human casualties within the facility.

In another embodiment, the present invention may be characterized as a method for responding to a fire emergency by receiving data characterizing fire threat conditions and facility conditions, evaluating a plurality of emergency scenarios, generating a response to each emergency scenario, and storing the responses for rapid recall.

In a further embodiment, the invention may be characterized as a method for responding to a fire emergency by detecting the fire, determining incident specifics of the fire from the detection, and rapidly implementing a previously stored response to the fire as a function of the incident specifics.

BRIEF DESCRIPTION OF THE DRAWINGS

The features and advantages summarized above in addition to other aspects of the present invention will become more apparent from the description, presented in conjunction with the following drawings.

Corresponding reference characters indicate corresponding components throughout the several views of the drawings.

DETAILED DESCRIPTION OF THE DRAWINGS

The following description is presented to disclose the currently known best mode for making and using the present invention. The scope of the invention is defined by the claims.

Figure 1:
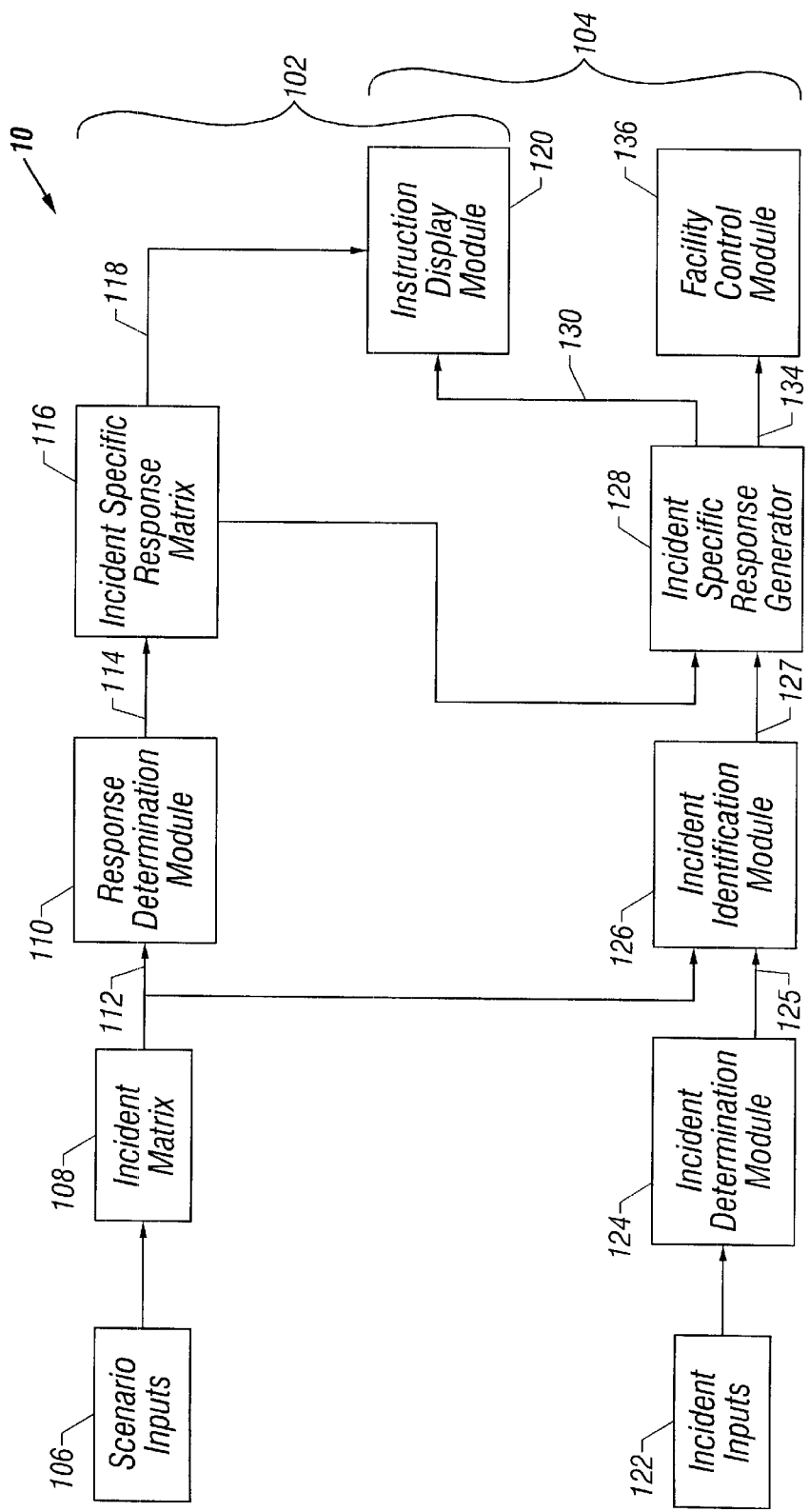
FIG. 1 is a block diagram illustrating components of a fire emergency response system according to an embodiment of the present invention.

FIG. 1 is a block diagram of a fire emergency response system 10 according to an embodiment of the present invention. The fire emergency response system 10 has two partitions, a scenario simulation partition 102 and an emergency response partition 104.

The scenario simulation partition 102 performs the steps of generating combinations of possible emergency scenario inputs before a fire emergency occurs, storing the combinations of scenario inputs that have a significant probability of representing a fire emergency, analyzing possible responses to each fire emergency scenario, selecting a response to minimize human casualties within a facility for each fire emergency scenario, and storing the response to each fire emergency scenario in a response matrix for rapid recall in a real fire emergency.

A facility is defined herein as any area or structure that may be occupied by one or more persons, such as vehicles, including vehicles used for public and private transportation, buildings, such as government buildings, public gathering places, office buildings, parking structures, factories, building complexes, such as sports complexes, geographical areas, such as parks, urban areas, and the like.

The scenario simulation partition 102 advantageously generates a matrix of intelligent emergency responses to virtually any emergency situation that may be analyzed from all the sources of information made available. The matrix of intelligent fire emergency responses may be immediately recalled in a real fire emergency without the processing time required for analyzing the input data to determine the optimum response.

The emergency response partition 104 receives as inputs fire threat conditions and facility operations, determines whether an incident is a fire emergency that threatens human life or may otherwise incapacitate personnel within the facility, identifies the incident, generates a specific response to the incident, displays instructions for carrying out the response to personnel within the facility, and controls facility equipment and resources to minimize human casualties within the facility.

The functions of the scenario simulation partition 102 and the emergency response partition 104 may be performed by either the fire emergency response system 10 of FIG. 1 according to one embodiment or in a method according to another embodiment by, for example, a computer concurrently performing the functions of the scenario simulation partition 102 and the emergency response partition 104.

The scenario simulation partition 102 includes scenario inputs 106 for inputting fire threat conditions, facility operations, and other data relevant to an emergency. The scenario inputs 106 are coupled to an incident matrix 108. The incident matrix 108 stores each combination of input conditions from the scenario inputs 106 and each possible state of each input condition to define likely combinations or scenarios of possible input states. A response determination module 110 receives as inputs scenarios 112 from the incident matrix 108, analyzes the scenarios, generates a matrix of response options for each scenario, and selects a response most appropriate to minimizing human casualties within the facility that might result for each scenario. The response determination module 110 outputs incident responses 114 to an incident specific response matrix 116. The incident specific response matrix 116 stores the incident responses 114 specific to each scenario and outputs appropriate instructions 118 for responding to each scenario to an instruction display module 120. The instruction display module 120 provides appropriate instructions to personnel at various locations within the facility in simple, well understood, and easily followed terms and is common to both the scenario simulation partition 102 and the emergency response partition 104.

The emergency response partition 104 includes incident inputs 122 for inputting fire threat conditions such as releases of smoke agents, meteorological conditions, facility operations, and other data relevant to an emergency including human observations. The incident inputs 122 are coupled to the incident determination module 124. The incident determination module 124 determines whether the combination of inputs characterizing the incident constitutes a fire emergency, or, for example, a false alarm. If a fire emergency is determined, the data characterizing the fire emergency are forwarded to the incident identification module 126. The incident identification module 126 inputs the data characterizing the fire emergency from the incident determination module 124 and identifies the specific fire emergency at hand from scenarios 112 stored in the incident matrix 108. An incident specific response generator 128 inputs incident identification data 127 from the incident identification module 126 and selects an emergency response from the responses stored in the incident specific response matrix 116. The incident specific response generator 128 outputs emergency instructions 130 to the instruction display module 120 and control signals 134 to a facility control module 136 corresponding to the emergency response.

FIGS. 2–9 are functional block diagrams describing in further detail the components of the emergency response system 10 of FIG. 1 and steps traversed thereby during its operation.

Figure 2:
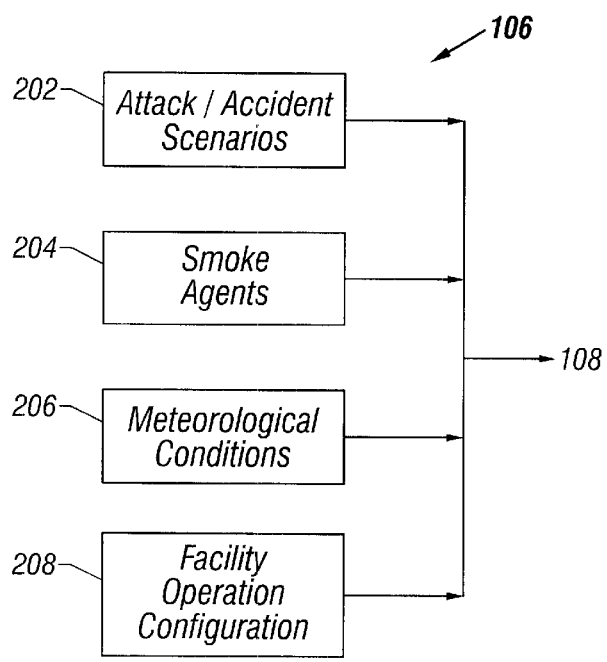
FIG. 2 is a functional block diagram of one variation of scenario inputs, such as may be used in the fire response system of FIG. 1.

FIG. 2 is a detailed block diagram of the scenario inputs 106 of FIG. 1. An exemplary set of fire threat conditions and facility operations, collectively scenario inputs 106, is shown as incident/accident scenarios 202, smoke agents 204, meteorological conditions 206, and facility operations 208.

The incident/accident scenarios 202 report the location, sequence, and timing of incidents, accidents, explosive releases, and fires.

The smoke agents 204 catalog a variety of chemical and biological substances that may threaten human life and provide corresponding data needed for calculating contaminant concentrations in various areas of the facility as a function of time and facility conditions.

The meteorological conditions 206 report the weather, temperature, humidity, wind speed and direction, and other external environmental conditions.

The facility operations 208 report internal environmental conditions such as temperature and humidity, ventilation system states (e.g., ducts open or closed, heating or cooling, return dampers open or closed, fresh air mixture, fans on or off), personnel locations and concentrations, elevator locations, windows open, closed, or broken, doors open or closed and locked or unlocked, and the like.

Combinations of conditions that are too unlikely to be considered a significant risk may be excluded from the incident matrix 108 to reduce the amount of data storage required. For example, a scenario having an outside temperature of 100° F. with all heating systems operating at maximum capacity and all windows closed might be excluded from the incident matrix 108 as being too unlikely to require a response.

Figure 3:
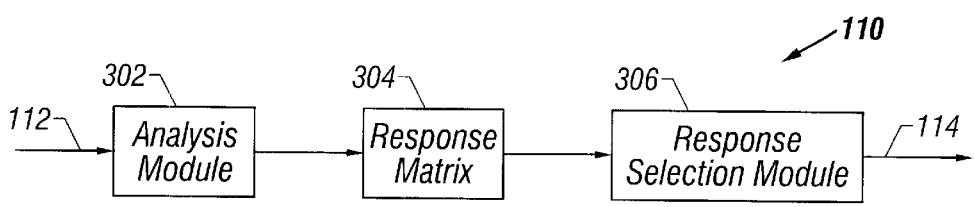
FIG. 3 is a functional block diagram of one variation of a response determination module, such as may be used in the fire emergency response system of FIG. 1.

FIG. 3 is a functional block diagram of the response determination module 110 in FIG. 1. The response determination module 110 has an analysis module 302 that analyzes scenarios 112 and generates a response matrix 304 of possible responses to each scenario. The response matrix 304 outputs the possible responses to a response selection module 306. The response selection module 306 selects the response most likely to result in a minimum of human casualties for the specific scenario input conditions provided as determined by the scenario inputs 106. For example, a response matrix 304 for a fire may include the following three responses: (1) continued operation of the lobby and main building HVAC systems, (2) shutting down the lobby and main building HVAC systems, and (3) shutting down the lobby HVAC system, closing the return dampers on floors 2–12, and continued normal operation of the main building HVAC system. The response selection module 306 selects response (3) for this scenario based on analysis criteria described below. Response (3) is then included in the incident specific response matrix 116 and the incident response generator 128.

Figure 4:
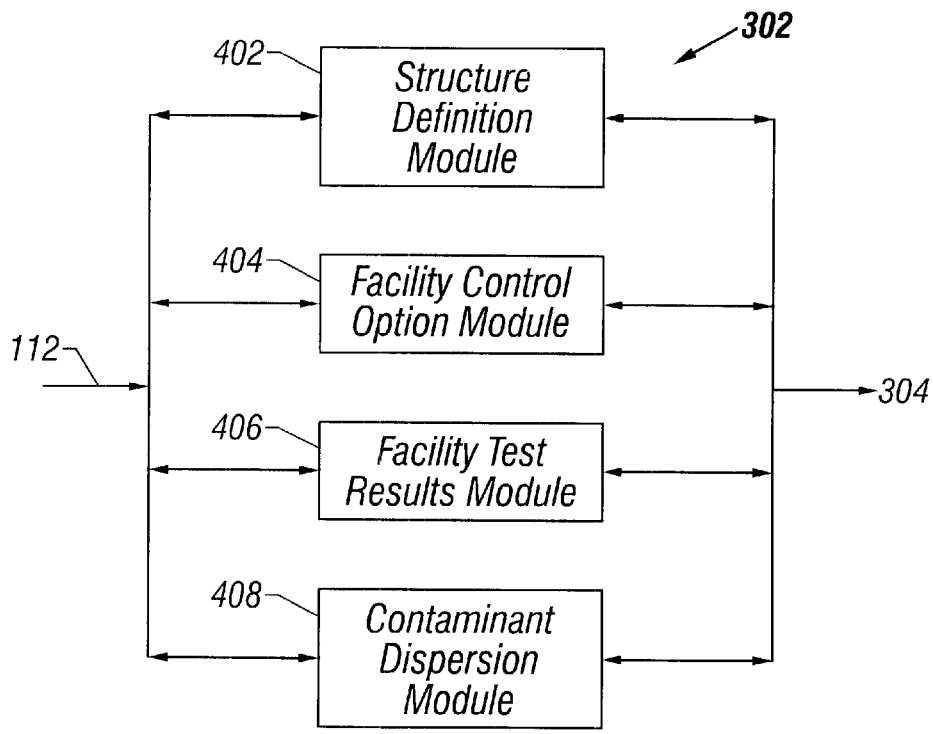
FIG. 4 is a functional block diagram of an analysis module, such as may be used in the fire emergency response system of FIG. 3.

FIG. 4 is a functional block diagram of the analysis module 302 of FIG. 3. The analysis module 302 includes a structure definition module 402, a facility control options module 404, a facility test results module 406, and contaminant dispersion models 408.

The structure definition module 402 defines the structural details such as floor plans, number of floors, points of air leakage, and location of exits.

The facility control component 404 defines the ways in which the facility may be configured, such as heating, ventilation, and air conditioning (HVAC) on or off, return and other dampers open or shut, fresh air mixture, and air flow rate.

The facility test results module 406 defines locations and flow rates of air leakage within the facility for windows, doors, shafts, and other facility penetrations and openings.

The contaminant dispersion models 408 model internal and external contaminant dispersion for a variety of toxic airborne contaminants that may be contained in smoke. The application of internal and external contaminant dispersion models to a facility emergency response system is an important feature of the present embodiment and will be discussed later in further detail. Referring again to FIG. 3, analysis module 302 generates a matrix of possible responses 304 to the response selection module 306.

Figure 5:
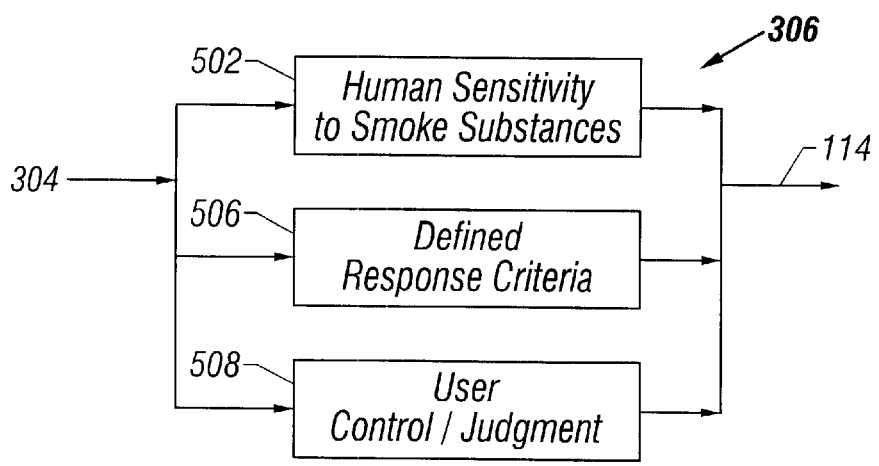
FIG. 5 is a functional block diagram of a response selection module, such as may be used in the fire emergency response system of FIG. 3.

FIG. 5 is a functional block diagram of the response selection module 306. The response selection module 306 compares each possible response from the possible response matrix 304 to criteria defining human sensitivity to smoke agents 502 and other defined response criteria 506, such as preferential protection requirements that may be established for certain parts of a facility, for example, where the highest concentration of personnel are located. Based on the criteria defining human sensitivity to smoke agents 502 and the other defined response criteria 506, the response selection module 306 selects the response most likely to minimize human casualties within the facility. The response selection module 306 also inputs user control/judgment 508 as a possible override option to change the selected response 114. The incident specific response matrix 116 stores each selected scenario response 114 and outputs a corresponding instruction command 118 to the instruction display module 120.

Figure 6:
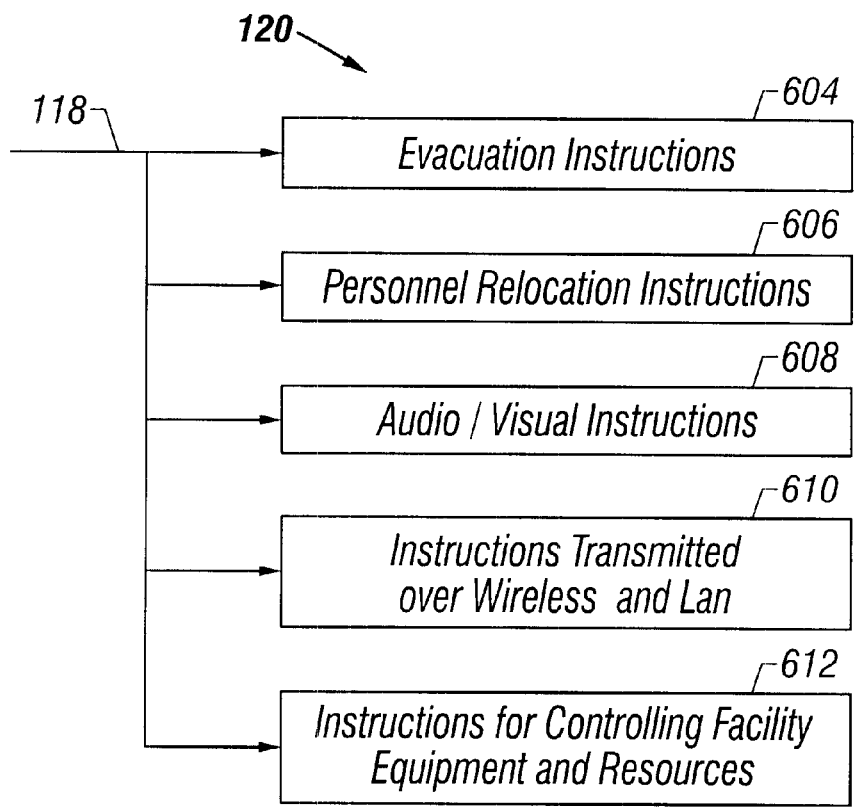
FIG. 6 is a functional block diagram of an instruction display module, such as may be used in the fire emergency response system of FIG. 1.

FIG. 6 is a detailed block diagram of the instruction display module 120. The instruction display module 120 outputs a set of emergency instructions for display for each emergency command 118 in simple, easily understood terms. An exemplary set of instruction displays is shown as evacuation instructions 604, personnel relocation instructions 606, audio/visual instructions 608, instructions transmitted over wireless and local area networks (LAN) 610, and instructions for controlling facility equipment and resources 612. For example, pre-recorded instructions for evacuation may be announced over a public address system, and exit displays may be automatically illuminated to highlight a specific evacuation route or to warn against using an evacuation route that has become dangerous. Facility personnel may follow announced and displayed instructions to operate facility equipment such as HVAC in a timely and safe manner to minimize human casualties. Instructions may also be transmitted to remote locations by, for example, cellular telephones, pagers, and personal digital assistants (PDAs).

Figure 7:
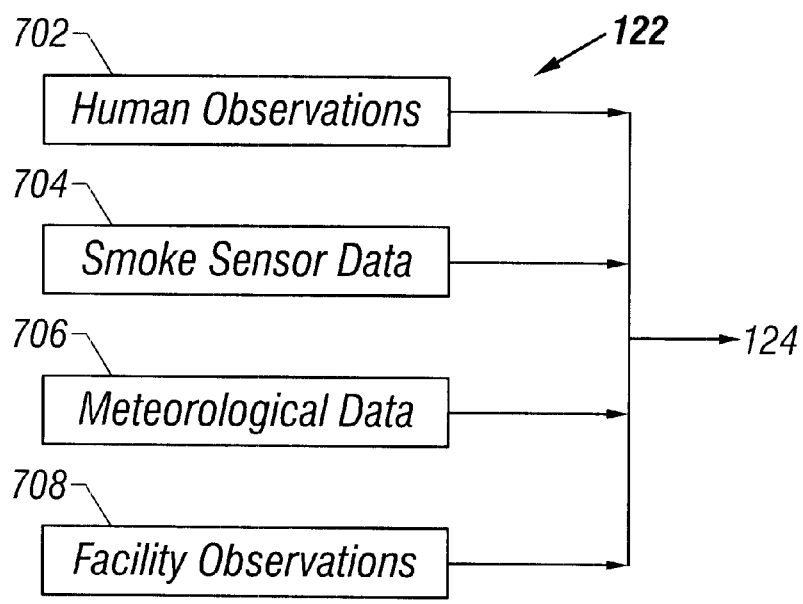
FIG. 7 is a functional block diagram of one variation of incident inputs, such as may be used in the fire emergency response system of FIG. 1.

FIG. 7 is a detailed block diagram of the incident inputs 122 of FIG. 1. An exemplary set of fire threat conditions and facility conditions shown as human observations 702, smoke agent sensor data 704, meteorological data 706, and facility operations data 708 is received as input to the incident determination module 124.

Human observations 702 report the location, sequence, and timing of incidents, accidents, and fires by, for example, an alarm panel. If desired, responses may be triggered by human observations alone without the use of smoke agent sensors.

The smoke sensor data 704 report a variety of chemical substances found in smoke that could incapacitate personnel and threaten human life.

The meteorological data 706 report the weather, temperature, humidity, wind speed and direction, and other external environmental conditions.

The facility operations data 708 report internal environmental conditions such as temperature and humidity, HVAC system states (e.g., ducts open or closed; heating, cooling, or off; damper returns open or closed; fresh air mixture ratio; fans on or off), personnel locations and concentrations, elevator locations, doors open or closed and locked or unlocked, and the like. The facility operations data 708 also include other conditions such as intrusion alarms, location and number of occupants, building damage, and other building structural condition data.

The incident determination module 124 receives as input the incident inputs 122 and the selected scenario responses 114 and checks whether the incident inputs 122 indicate a fire emergency that may incapacitate personnel or threaten human life. This step avoids undue reaction to false alarms. If the incident inputs 122 indicate a fire emergency, then emergency identification information 125 is output to the incident identification module 126.

Figure 8:
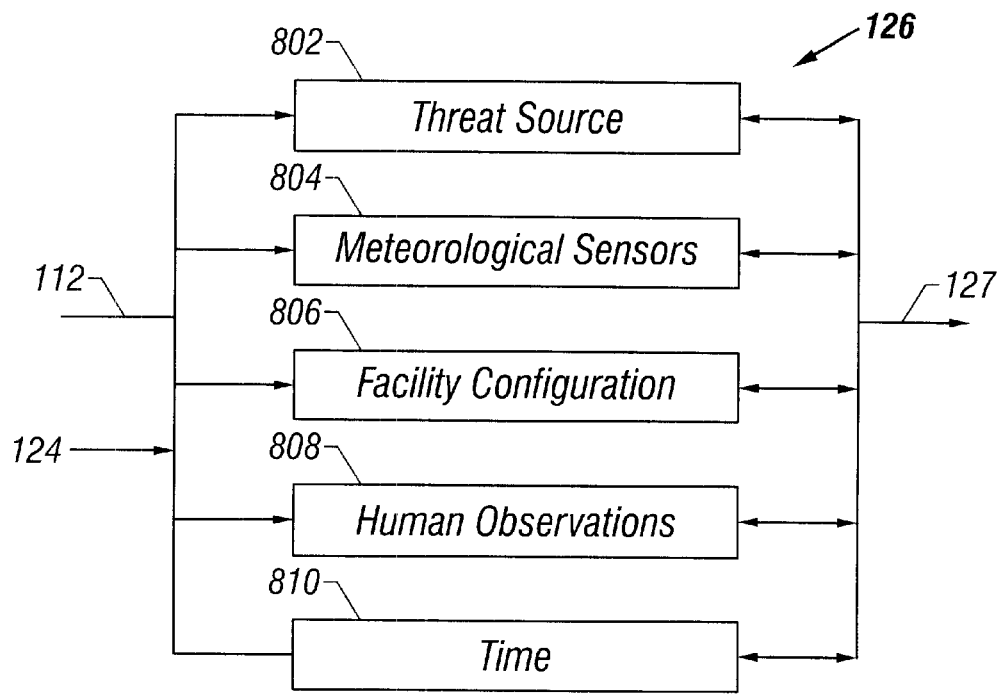
FIG. 8 is a functional block diagram of one variation of an incident identification module, such as may be used in the fire emergency response system of FIG. 1.

FIG. 8 is a detailed block diagram of the incident identification module 126 of FIG. 1. The incident identification module 126 has a fire threat source component 802, a meteorology component 804, a facility configuration component 806, a human observations component 808, and a time component 810.

The fire threat source component 802 considers fire threat source data 125 from the incident determination module 124 in the context of weather conditions received as input from the meteorology component 804, facility configuration information received as input from the facility configuration component 806, eyewitness reports received as input from the human observations component 808, and the time of the incident received as input from the time component 810. The incident identification module 126 maps the scenario 112 from the incident matrix 108 to identify the emergency and outputs specific incident data 127 to the incident specific response generator 128.

Figure 9:
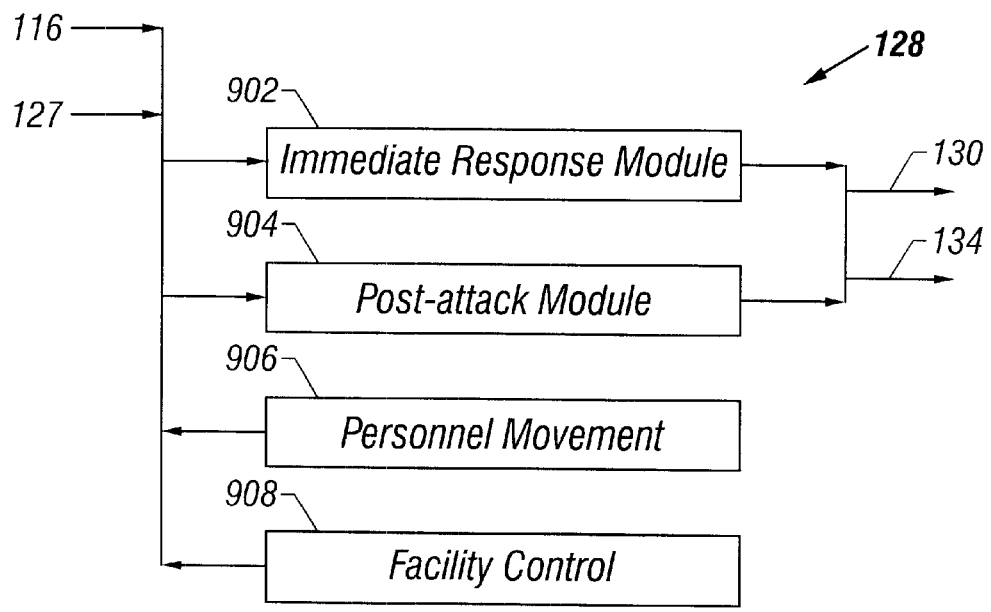
FIG. 9 is a functional block diagram of one variation of an incident specific response generator, such as may be used in the fire emergency response system of FIG. 1.

FIG. 9 is a detailed block diagram of the incident specific response generator 128 in FIG. 1. The incident specific response generator 128 includes an immediate response module 902 and a post incident module 904. The immediate response module 902 and the post incident module 904 each input data from a personnel movement component 906 and a facility control component 908.

The incident specific response generator 128 receives as inputs specific incident data 127 from the incident identification module 126 and generates as output emergency instructions 130 to the instruction display module 120 and control signals 134 to the facility control module 136.

The immediate response module 902 selects an emergency response from the incident specific response matrix 116 that corresponds to the specific incident data 127 and outputs instructions for immediate action to the instruction display module 120 and to the facility control module 136 in FIG. 1 according to the instructions input from the personnel movement component 906 and the facility control component 908.

The post incident module 904 outputs instructions for follow-up action after the emergency to the instruction display module 120 and to the facility control module 136 in FIG. 1 according to the instructions input from the personnel movement component 906 and the facility control component 908.

The personnel movement component 906 contains instructions for routing personnel located within the facility to safety for both the immediate response module 902 and the post incident module 904.

The facility control component 908 contains instructions for operating facility equipment and resources for both the immediate response module 902 and the post incident module 904.

Figure 10:
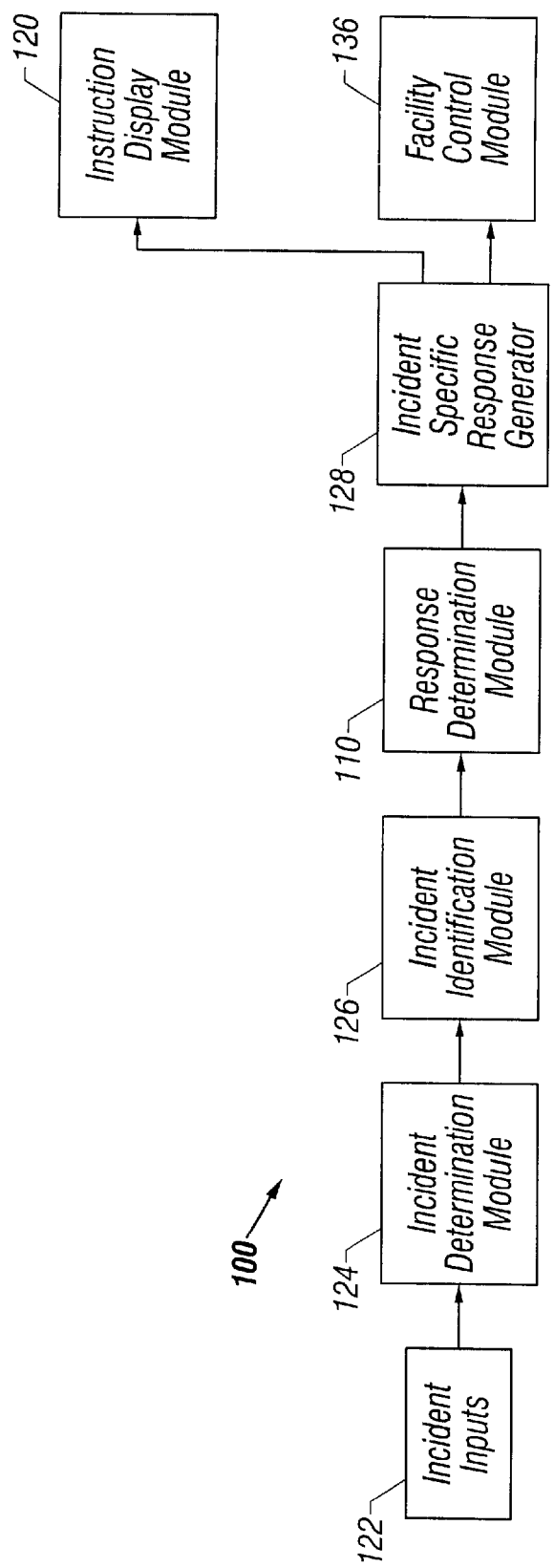
FIG. 10 is a block diagram illustrating an alternative arrangement of components for an integrated fire emergency response system according to an another embodiment of the present invention.

FIG. 10 is a block diagram of an integrated fire emergency response system 100 according to an alternative embodiment. The integrated emergency response system 100 is similar to the fire emergency response section 104 in FIG. 1 with the exception that the response determination module 110 is included between the incident identification module 126 and the incident specific response generator 128. The integrated fire emergency response system 100 provides the capability of analyzing and responding to an emergency without the requirement of generating and storing a full range of pre-determined scenarios. Although greater computer power is needed to analyze scenarios in real time, the system cost may be substantially reduced.

The application of internal and external contaminant dispersion models to the analysis of a facility fire emergency in the discussion of FIG. 4 above may be implemented as follows. An important requirement of this embodiment that includes modeling contaminant dispersion is the proper setting of boundary conditions. The boundary conditions include external contaminant transport modeling (for external contaminant sources) from the source to the facility and accurate descriptions for the specific facility of leakage and flow through window frames, structure joints and electrical and plumbing chases, exterior envelope quality, tightness of elevator shafts and stairwells, HVAC configuration and the like. Such modeling techniques have been documented and may be implemented by one of ordinary skill in the art. See, for example, Grot, R. A. *User Manual NBSAVIS CONTAM88, A User Interface for Air Movement and Contaminant Dispersal Analysis in Multizone Buildings,* NISTIR 4585, National Institute of Standards and Technology (NIST); and Kurabuchi, T., J. B. Fang and R. A. Grot (1990), *A Numerical Method for Calculating Indoor Air Flows Using a Turbulence Model,* NISTIR 89-4211.

In accordance with the embodiment of the contaminant dispersion module 408 in FIG. 4, two state of the art airflow and contaminant dispersal programs are used to model migration of chemical and biological agents through a facility, based on the exemplary boundary conditions set forth above. These programs can simulate multiple contaminant sources, multiple contaminants, aerosols, and particulates including smoke.

A first set of programs, IAQFLOW/CONTFLOW, are multiple zone models that model airflow and contaminant migration in multi-compartment buildings. These programs are owned by Lagus Applied Technology, Inc. of San Diego, California, and are hereby incorporated by reference.

A second set of programs is a series of computational fluid dynamic (CFD) models, EXFLOW and EXCONT. These programs are owned by Lagus Applied Technology, Inc. of San Diego, Calif., and are hereby incorporated by reference.

The program IAQFLOW is a building description processor that allows a natural description of the building, its HVAC system, contaminant sources, and all the above-mentioned boundary conditions to be input from data generated by a study and testing of the facility.

The program IAQFLOW processes building description data and produces non-linear network data required to solve multi-zone flow and contaminant migration equations in the CONTFLOW program.

These programs have been used to model airflow and contaminant migration of buildings of up to fifty-two stories. IAQFLOW and CONTFLOW were developed by Dr. Grot at Lagus Applied Technologies, Inc. (LAT) and are advanced versions of CONTAM/AIRMOV programs developed and tested at the National Institute of Standards and Technology (NIST) under the direction of Dr. Grot. These models are widely used and understood by those skilled in the field of contaminant flow modeling.

Computational Fluid Dynamics programs EXFLOW and EXCONT model details of air movement and contaminant dispersal inside building spaces, for example, airport terminal check-in areas, atriums, chemical laboratories, etc. Both natural and HVAC induced temperature and pressure differences drive air and contaminant motions and are considered by EXFLOW and EXCONT. EXFLOW and EXCONT were developed by Dr. Grot and are advanced versions of the Computational Fluid Dynamics programs EXACT 3 and CONTAM 3 developed at the National Institute of Standards and Technology and the University of Tokyo, and are widely used by building researchers.

Many applications require coupling of the zonal models with the Computational Fluid Dynamics models and the test data. The Computational Fluid Dynamics model is used to describe semi-open spaces within facilities while ventilation to these spaces are described with the zonal model.

Test data are used to determine facility leakage and facility ventilation characteristics that are input to the models.

Exterior contaminant flow may be modeled, for example, using a program such as PC-SCIPUFF. This program is available from the Defense Threat Reduction Agency (DTRA) and is widely used and understood by experts in the field of plume modeling.

Contaminant dispersion data determined by the PC-SCIPUFF program for external incidents are used as an input to interior IAQFLOW and CONTFLOW and EXFLOW/EXCONT flow models. PC-SCIPUFF uses data describing releases from structures to determine downstream hazards. By including downstream hazards in the response analysis, emergency responses may be developed not only for the subject facility, but also for adjacent or nearby facilities. In this way emergency responses may be extended from individual buildings to complexes and coordinated to minimize overall casualties, for example, in a campus of buildings.

Figure 11:
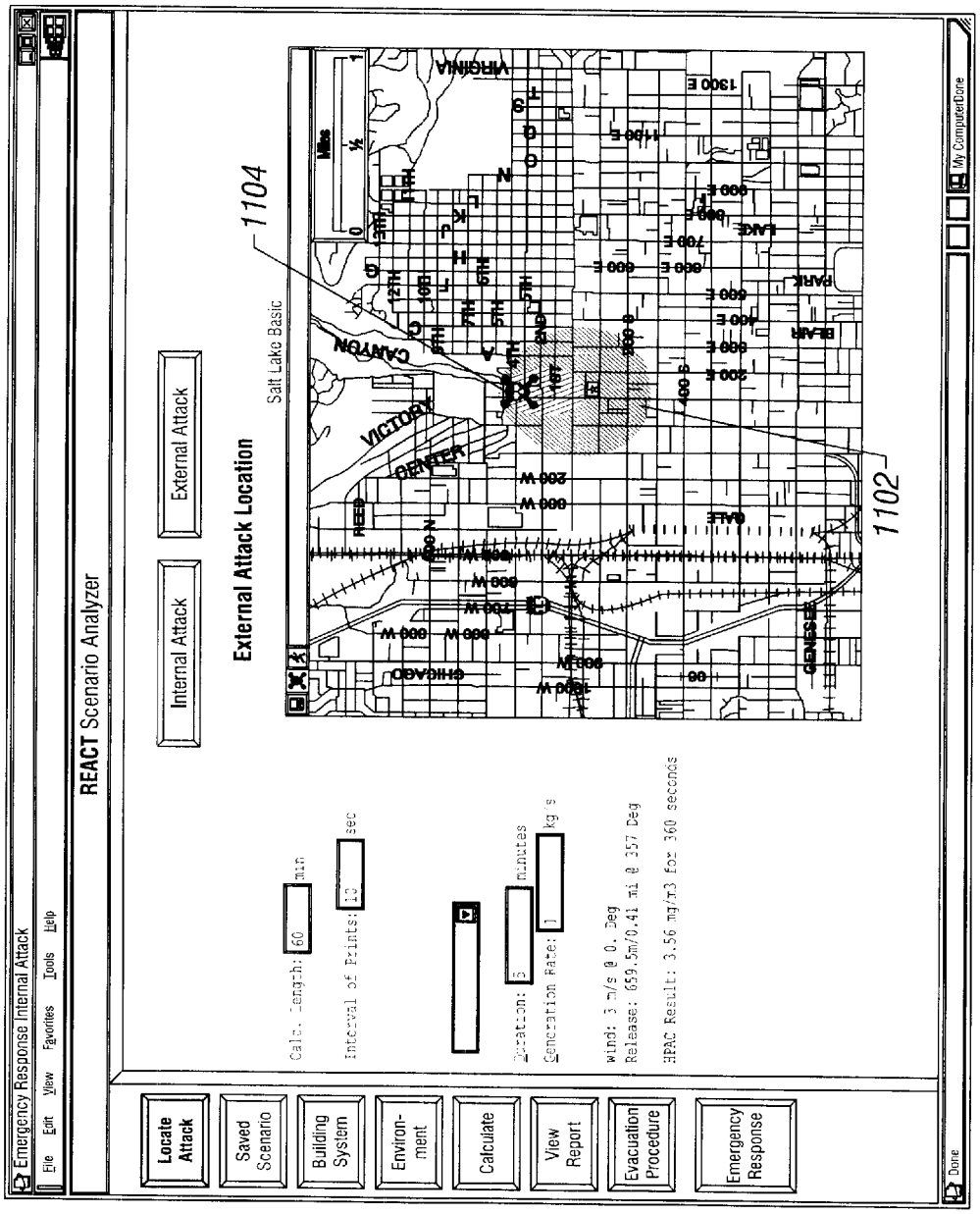
FIG. 11 is an computer display illustrating an exemplary SCIPUFF plume pattern calculated for smoke released from a fire.

A typical example of a PC-SCIPUFF analysis is shown in FIG. 11. FIG. 11 illustrates an exemplary SCIPUFF plume pattern 1102 calculated for smoke released from a fire 1104. SCIPUFF (second-order closure integrated puff), is selected as an example due to its acceptance as a Department of Defense atmosphere transport model, and is under continued development by DTRA. SCIPUFF (of which PC-SCIPUFF is a specific implementation) is an advanced Lagrangian Gaussian puff model that describes atmospheric transport and dispersion of vapor, aerosol, and specific contaminants. It considers turbulence, boundary layer and terrain effects, meteorological coupling, and atmospheric chemistry. SCIPUFF uses second order turbulence closure techniques to rapidly compute measurable turbulent velocity statistics. Additionally, a closure model provides a prediction of the statistical variance in the concentration field, which can be used to estimate uncertainty in dispersion prediction resulting from inherent uncertainty in wind fields.

While the above description contemplates the use of the specific modeling programs described above, the present embodiments are implemented using a modular design. As superior modeling tools are developed, or as specific modeling tools are identified as being superior for specific applications, such modeling tools can readily be incorporated into these and other embodiments according to the present invention.

The fire emergency response system embodiments described above provide an intelligent process capable of estimating the location and assessing the nature of a fire, predicting the consequences of fire and smoke release based on current environmental conditions, facility operational configuration and occupancy, and determining countermeasures in real time to minimize damage to a facility and its occupants. The countermeasures include providing instructions to safely evacuate personnel from contaminated areas, to configure the operation of HVAC equipment to minimize spreading the hazardous substance, to notify when areas may become hazardous to enter or safe for entry and use.

Other modifications, variations, and arrangements of the present invention may be made in accordance with the above teachings other than as specifically described to practice the invention within the spirit and scope of the following claims.

What is claimed is:

1. A method for generating an automated response to an emergency comprising the following steps:
    (a) receiving as input fire threat condition data for a facility;
    (b) comparing the fire threat condition data with a previously determined scenario in an incident matrix to identify a fire emergency; and
    (c) selecting a response corresponding to the identified fire emergency from a previously determined matrix of possible emergency responses to minimize human casualties.

2. The method of claim 1 wherein the facility includes at least one of a vehicle for public or private transportation, a government building, an office building, a public gathering place, a parking structure, a factory, a building complex, a park, and an urban area.

3. The method of claim 1 wherein the fire threat condition data include at least one of human observations, smoke agent release data, explosive release data, and meteorological data.

4. The method of claim 1 wherein step (a) includes receiving as input facility operations data.

5. The method of claim 4 wherein the facility operations data include at least one of temperature, humidity, HVAC system states, personnel locations and concentrations, elevator locations, doors open or closed and locked or unlocked, intrusion alarms, location and number of occupants, and structural condition data.

6. The method of claim 4 further including the step of storing the fire threat condition data and the facility operations data in the previously determined incident matrix.

7. The method of claim 1 wherein the previously determined matrix of possible emergency responses is based on analyzing at least one of facility structure, facility control options, facility test results, and contaminant dispersion models.

8. The method of claim 7 wherein the contaminant dispersion models include at least one of a multiple zone model of airflow and contaminant migration in multi-compartment buildings, a computational fluid dynamic model, and an exterior contaminant flow model.

9. The method of claim 1 wherein step (c) includes selecting the response corresponding to the identified fire emergency from the previously determined matrix of possible emergency responses based on at least one of human sensitivity to smoke substances, defined response criteria, and user control and judgment criteria.

10. The method of claim 1 further including the step of (d) generating as output commands or instructions for implementing the selected response.

11. The method of claim 10 further including the step of (e) communicating the commands or instructions for carrying out the selected response.

12. The method of claim 11 wherein step (e) includes communicating at least one of evacuation instructions, personnel relocation instructions, audio/visual instructions, instructions transmitted over a local area network, and instructions transmitted over wireless devices.

13. An apparatus for generating an automated response to a fire emergency comprising:
    at least one input for receiving fire threat condition data for a facility;
    an incident identification module coupled to a plurality of inputs for identifying a fire emergency from the fire threat condition data and a previously determined incident matrix of emergency scenarios; and an incident specific response generator coupled to the incident identification module for selecting an emergency response corresponding to the fire emergency from a previously determined matrix of possible emergency responses.

14. The apparatus of claim 13 further comprising an instruction module coupled to the incident specific response generator for communicating instructions corresponding to the selected emergency response.

15. The apparatus of claim 14 wherein the communicated instructions include instructions for routing personnel within the facility to safety.

16. The apparatus of claim 14 wherein the communicated instructions include instructions for controlling facility equipment and resources.

17. The apparatus of claim 13 wherein the facility includes at least one of a vehicle for public or private transportation, a building, a public gathering place, a parking structure, a factory, a building complex, a park, and an urban area.

18. The apparatus of claim 13 wherein the fire threat condition data include at least one of human observations, smoke release data, explosive release data, and meteorological data.

19. The apparatus of claim 13 further including at least one input for receiving facility operations data into the previously determined incident matrix.

20. The apparatus of claim 19 wherein the facility operations data include at least one of temperature, humidity, HVAC system states, personnel locations and concentrations, elevator locations, open, closed, locked, and unlocked doors; open, closed, and broken windows; facility penetrations and openings, intrusion alarms, location and number of occupants, and structural condition data.

21. The apparatus of claim 13 wherein the previously determined matrix of possible emergency responses is based on at least one of facility structure, facility control options, facility test results, and contaminant dispersion simulated by a contaminant dispersion model.

22. The apparatus of claim 21 wherein the contaminant dispersion model includes at least one of a multiple zone model of airflow and contaminant migration in multi-compartment buildings, a computational fluid dynamic model for internal and external flow, and an exterior air flow model.

23. A method for generating an automated response to a fire emergency, comprising the steps of:

receiving a plurality of first inputs relevant to one or more fire emergency conditions;

storing combinations of one or more of the first inputs and states of the first inputs in an incident matrix and associating each of the combinations of the first inputs with one of the fire emergency conditions;

analyzing the combinations of the first inputs to generate a matrix of fire emergency response options for each of the combinations of the first inputs;

selecting an emergency response from the matrix of emergency response options to minimize human casualties for each of the combinations of the first inputs;

arranging the selected emergency response associated with each of the combinations of the first inputs in a response matrix;

receiving one or more second inputs relevant to threat conditions;

identifying from the incident matrix one of the emergency conditions corresponding to a combination of the second inputs; and selecting from the response matrix one of the emergency responses corresponding to the identified emergency condition.

24. A system for generating an automated response to a fire emergency, comprising:

an incident matrix that receives a plurality of first inputs relevant to one or more fire emergency conditions, stores combinations of one or more of the first inputs, and associates each of the combinations of the first inputs with a fire emergency scenario;

a response determination module that receives and analyzes the emergency scenarios from the incident matrix to generate a matrix of emergency response options for each of the emergency scenarios, wherein the response determination module further selects an emergency response from the matrix of emergency response options to minimize human casualties for each of the emergency scenarios;

a response matrix that receives the selected emergency responses for the emergency scenarios and arranges each of the selected emergency responses with a corresponding one of the emergency scenarios;

an incident determination module that receives one or more second inputs relevant to threat conditions;

an incident identification module that receives the emergency scenarios from the incident matrix and a combination of the second inputs from the incident determination module and identifies the combination of the second inputs as one of the emergency scenarios; and an incident specific response generator that receives the identified emergency condition from the incident identification module and the selected emergency response corresponding to the identified emergency scenario from the response matrix and outputs emergency instructions based on the corresponding selected emergency response.

* * * * *